United States Patent
Yehuday et al.

(10) Patent No.: US 11,725,939 B2
(45) Date of Patent: Aug. 15, 2023

(54) SYSTEM AND METHOD FOR CONTROLLING A LIGHT PROJECTOR IN A CONSTRUCTION SITE

(71) Applicant: LIGHTYX SYSTEMS LTD., Tel Aviv (IL)

(72) Inventors: Uri Yehuday, Holon (IL); Tomer Shaul Elran, Petah-Tikva (IL)

(73) Assignee: LIGHTYX SYSTEMS LTD.

( * ) Notice: Subject to any disclaimer, the term of this patent is extended or adjusted under 35 U.S.C. 154(b) by 0 days.

(21) Appl. No.: 17/685,724

(22) Filed: Mar. 3, 2022

(65) Prior Publication Data
US 2022/0187071 A1 Jun. 16, 2022

Related U.S. Application Data

(63) Continuation of application No. PCT/IL2020/050962, filed on Sep. 3, 2020.
(Continued)

(51) Int. Cl.
*G01C 15/00* (2006.01)
*H04N 9/31* (2006.01)
*G01B 11/25* (2006.01)

(52) U.S. Cl.
CPC .......... *G01C 15/006* (2013.01); *G01B 11/25* (2013.01); *H04N 9/3161* (2013.01); *H04N 9/3179* (2013.01)

(58) Field of Classification Search
None
See application file for complete search history.

(56) References Cited

U.S. PATENT DOCUMENTS

| 5,661,667 A | 8/1997 | Rueb et al. |
| 2013/0003037 A1 | 1/2013 | Nau |

(Continued)

FOREIGN PATENT DOCUMENTS

| CN | 107517366 A | * 12/2017 | |
| CN | 109425307 A | * 3/2019 | ......... G01B 11/2433 |
| WO | WO 2018/229769 | 12/2018 | |

OTHER PUBLICATIONS

International Search Report and Written Opinion for PCT Application No. PCT/IL2020/050962, dated Feb. 11, 2021.

*Primary Examiner* — Bao-Luan Q Le
*Assistant Examiner* — Danell L Owens
(74) *Attorney, Agent, or Firm* — Pearl Cohen Zedek Latzer Baratz LLP

(57) ABSTRACT

A method and a system for projecting a construction plan or a specified pattern in a construction site. The system may include: a light projector configured to project an image associated with the construction plan or the specified pattern, onto a specific surface within the construction site; at least one sensor configured to obtain dimensional parameters of at least one of: the specific surface, and the image as projected on the specific surface; and a computer processor configured to: derive, from the construction plan or the construction pattern, an intended projection portion which comprises visual content intended to be projected on the specific surface; calculate a model of said image, based on the dimensional parameters obtained from the at least one sensor; and generate a modified projection portion based on the model, and the intended projection portion, wherein the light projector is further configured to project said modified projection portion.

19 Claims, 18 Drawing Sheets

Related U.S. Application Data

(60) Provisional application No. 62/895,518, filed on Sep. 4, 2019.

(56) References Cited

U.S. PATENT DOCUMENTS

| | | |
|---|---|---|
| 2013/0033596 A1 | 2/2013 | Crothers et al. |
| 2016/0223327 A1 | 8/2016 | Norman et al. |
| 2017/0280114 A1* | 9/2017 | Samuelson ........... G06T 3/0068 |
| 2018/0286065 A1 | 10/2018 | Knorr et al. |

* cited by examiner

1310 — providing within a construction site, a light projector configured to project an image associated with the portion of the construction plan onto at least one specific surface within the construction site, by projecting a set of vectors, starting at an XYZ position within the light projector and ending at respective XYZ coordinates, wherein the light projector comprises a sensor recording at least one of: a set of XYZ coordinates of the at least one specified surface, and a set of XYZ coordinates of the image as projected on the specific surface 1320 — generating, based on the construction plan, and the XYZ coordinates recorded by the sensor, an "as built" model representing surfaces and elements as built in the construction site 1330 — deriving, from the construction plan, an intended projection portion which comprises visual content and dimensional data intended to be projected on the specific surface 1340 — calculating XYZ coordinates for the intended projection portion, based on the "as built" model and the XYZ position of the light projector 1350 — projecting the intended projection portion onto the specific surface with the calculated XYZ coordinates for the intended projection portion

SYSTEM AND METHOD FOR CONTROLLING A LIGHT PROJECTOR IN A CONSTRUCTION SITE

CROSS REFERENCE TO RELATED APPLICATIONS

This application is a continuation of PCT Application No. PCT/IL2020/50962, filed on Sep. 3, 2020, which claims the benefit of U.S. provisional patent application No. 62/895,518, filed on Sep. 4, 2019, which is incorporated herein by reference in its entirety.

FIELD OF THE INVENTION

The present invention relates generally to the field of augmented reality projection, and more specifically, to a system and method for projecting and adapting the projection of an augmented reality projector.

BACKGROUND OF THE INVENTION

Most standard construction processes involve two principal stages, namely a design stage and a build stage. In the design stage, an architect typically plans the layout and composition of a structure and possibly proposes a construction timeframe or schedule. In the build stage, a contractor, possibly assisted by a team of builders, implements the architectural plan, and thereby builds the structure and/or associated facilities according to the specification and schedule provided.

In order to ensure that the resultant structure matches the architectural plans as closely as possible, build stages are often very slow and may entail a plurality of surveyors regularly assessing and measuring aspects of the construction to obviate the emergence or continuation of plan divergence. This is generally important as, should significant unintended plan divergence occur, there may be limited opportunity to rectify the construction (e.g., the building structure, pipework, and the like) later on during the build cycle. In particular, certain levels of plan divergence could impede structural integrity and moreover necessitate substantial modification, overhaul or even rebuild. In some circumstances, particularly where there are strict timeframes or budgets at play, plan divergence may be prohibitively expensive or timely to rectify and moreover could result in the construction project being completed late, over-budget and/or remain unfinished.

In order to improve build accuracy and efficiency, a number of known electronic devices are often employed during build projects, such as laser distance meters and three-dimensional (3D) reconstruction tools. These electronic devices are however cumbersome, insufficiently accurate and sometimes unwieldy to use, and moreover often address localized, rather than macroscopic, aspects of the construction.

More recent developments include the so-called "Adaptive Projected Reality" (APR) approach, as originally disclosed by LightYX Systems Ltd. in International Publication Number WO2018/229769 A1, which is incorporated herein by reference. Devices incorporating APR techniques are growing in prevalence and popularity and are typically characterized by features enabling the real-time projection of visual instructions and/or images onto one or more surfaces in a scene. APR devices may moreover be capable of adaptively changing and aligning their projected content relative to varying environments in accordance with plans or build schematics.

APR devices typically utilize laser systems, such as laser projectors or survey tools, to mark accurate points, shapes, or even entire plans within a construction site. Such systems usually require knowledge of reference features within the construction site in order to conduct a registration process and thereby position themselves within the build space such that they may project plans accurately in alignment with the environment.

Once the APR device has been registered and stationed knowing its position (or relative position) and knowing the surfaces and surrounding elements as described by the construction plan, the device can project accurately a portion of the construction plan, usually feature, elements or a pattern thereof (such as borders of a window, piping location on ceiling and the like) onto at least one specific surface that has been built according to the construction plan.

The projection of the pattern or the feature allows the builders to easily orientate within the construction site, understand his intended work and carry out the building task associated with the projected feature, such as cutting out a window in a wall, placing a wall in the right location on the floor, placing a pipe on the ceiling. This process is usually called setting out.

However, the actual projection does not always match the intended projected for various reasons. In a case that the registration process was not fully successful, the position of the projector is wrong and the projected image shall have a mismatch as to location, orientation or even scale. In a case that the projector itself is faulty (e.g. non ideal), the projected image shall be deformed.

Finally, for example in a case that the surface upon the image is projected is different (e. g., not is the same position/orientation or surface dimensions and geometry) from the surface in the construction plan, namely the "as built" is different from the "as planned", the projected image will also be deformed due to these differences.

SUMMARY OF THE PRESENT INVENTION

In accordance with some embodiments of the present invention, a system for projecting a portion of a construction plan within a construction site is provided herein. The system may include: a light projector configured to project an image associated with the portion of the construction plan onto at least one specific surface within the construction site, by projecting a set of vectors, starting at an XYZ position within the light projector and ending at respective XYZ coordinates; at least one sensor configured to record at least a portion of vector data to at least one set of XYZ coordinates in the construction site; and a computer processor configured to: generate, based on the construction plan, and the XYZ coordinates recorded by the sensor, an intended projection portion which comprises visual content and dimensional data intended to be projected on the at least one specific surface which appears in the construction plan; calculate XYZ coordinates for the intended projection portion, based on the construction plan and the XYZ position of the light projector; wherein the light projector is further configured to project said intended projection portion onto the at least one specific surface.

In order to address the aforementioned drawbacks, some embodiments of the invention provide a device and related methods for automatically adapting and/or adjusting the content of a projected portion of a construction plan or a specified pattern thereof, based on the position/orientation/ dimension/geometry of the at least one specified "as built" surface intended for projecting, so as the actual projected content resembles the intended content for projection. Alternatively, the actual projected content is optimized for user needs (for example not projecting at all on non-compliant surfaces).

In other embodiments the invention provides a device and related methods for automatically adapting and/or adjusting the content of a projected portion of a construction plan or a specified pattern thereof, based on the error or absence of the device position onsite (relative to reference points) or relative to the surface or other features so as the actual projected content resembles the intended content for projection. In some embodiments, the projection may be adjusted due to position of the APR device and/or non-ideal ideal behavior of the APR device, and/or position/orientation/dimension/geometry of the at least one specified "as built" surface. Alternatively, actual projected content can be optimized for user needs, for example, by not projecting at all in a case that the position of the projector is erroneous.

In other embodiments the invention provides a device and related methods for automatically adapting and/or adjusting the content of a projected portion of a construction plan or a specified pattern thereof, based on the error of the projector device being non ideal device so as the actual projected content resembles the intended content for projection. Alternatively, the actual projected content may be optimized for user needs, for example, by not projecting on at all when the projector indicates a fault in its operation.

According to some embodiments of the present invention a system for projecting a portion of a construction plan within a construction site is provided herein. The system may include: a light projector configured to project an image associated with the portion of the construction plan onto at least one specific surface within the construction site, by projecting a set of vectors, starting at an XYZ position within the light projector and ending at respective XYZ coordinates; at least one sensor configured to record at least some of: a set of XYZ coordinates of the at least one specified surface, and a set of XYZ coordinates of the image as projected on the at least one specific surface; and a computer processor configured to: derive, from the construction plan, an intended projection portion which comprises visual content and dimensional data intended to be projected on the at least one specific surface which also appears in the construction plan; calculate XYZ coordinates for the intended projection portion, based on the construction plan and the XYZ position of the light projector; compare the XYZ coordinates recorded by the sensor with the XYZ coordinates for the intended projection portion, to detect respective XYZ displacements; generate a modified projection portion based on the detected respective XYZ displacements, wherein the light projector is further configured to project said modified projection portion onto the specific surface.

According to some embodiments of the present invention, a system for projecting a portion of a construction plan within a construction site, is provided herein. The system may include: a light projector configured to project an image associated with the portion of the construction plan onto at least one specific surface within the construction site, by projecting a set of vectors, starting at an XYZ position within the light projector and ending at respective XYZ coordinates; at least one sensor configured to record at least some of: a set of XYZ coordinates of the at least one specified surface, and a set of XYZ coordinates of the image as projected on the on the at least one specific surface; and a computer processor configured to: generate, based on the construction plan, and the XYZ coordinates recorded by the sensor, an "as built" model representing surfaces and elements as built in the construction site; derive, from the construction plan, an intended projection portion which comprises visual content and dimensional data intended to be projected on the at least one specific surface which appears in the construction plan and/or in the "as built" model; calculate XYZ coordinates for the intended projection portion, based on the "as built" model and the XYZ position of the light projector, wherein the light projector is further configured to project said intended projection portion onto the specific surface.

These and other advantages of the present invention are set forth in detail in the following description.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 13 is a high-level flowchart diagram illustrating a method in accordance with embodiments of the present invention.

Figure 1A:
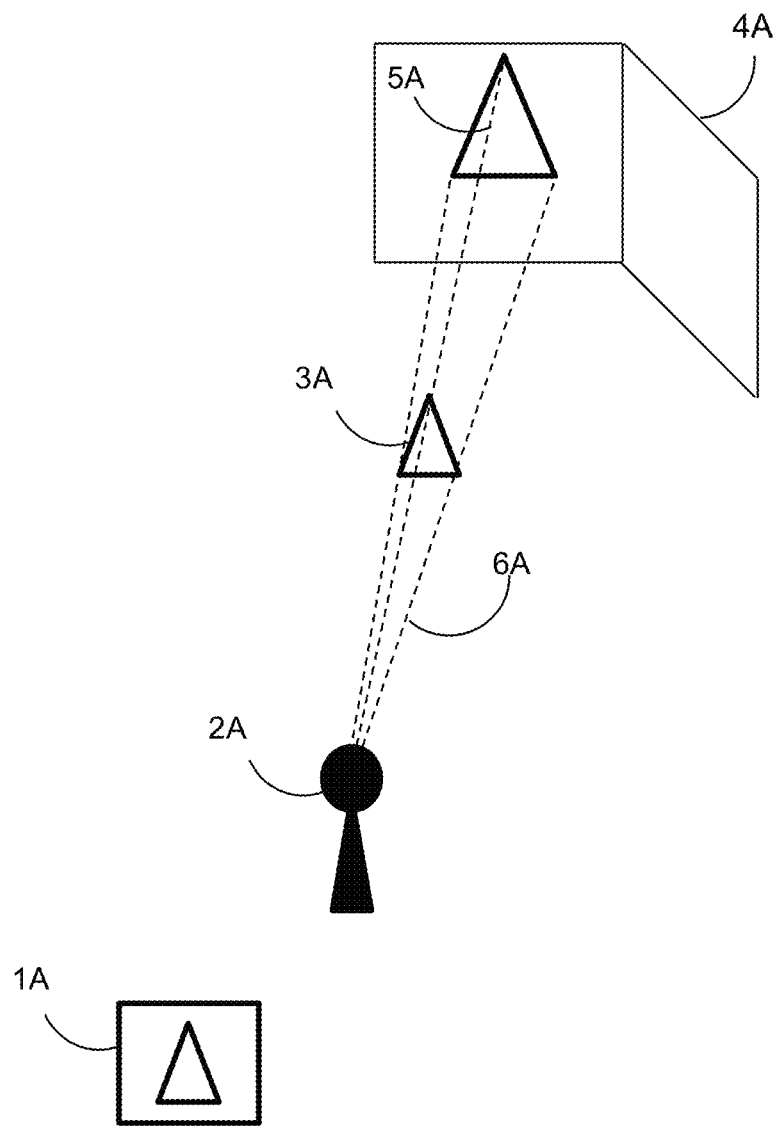
FIG. 1A, FIG. 1B, FIG. 1C, and FIG. 1D are high-level diagrams depicting a projector within a construction site in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Prior to setting forth the detailed description of the invention, the following term definitions are provided.

The term "construction plan", "construction plan model" or "as planned" as used herein refers to a digital 2D plan or a digital 3D plan in some embodiments it might refer to building information model (BIM) used in the process of planning a construction work and used during construction in a construction site.

The term "captured scene model", "'as built' model" or "as built" as used herein refers to actual surfaces and elements as recorded and sensed in the construction site during construction in a construction site.

The term "scene", as used herein refers to the area where the APR is being deployed for enabling the builders complete the construction works. The scene is a portion of the construction plan where the APR is deployed. The "projected visual content" or the "intended projection portion" is content that is taken from the construction plan and is intended for projecting on a specific surface which is within the scene.

The term 'adaptive' as used herein refers generally to capability or susceptibility to undergo accordant change to improve fit or suitability. More specifically, in the present context 'adaptive' refers to the capacity of a system or tool to vary its output, for example its projected output, in accordance with a dynamic scene, environmental alterations or a movement of the device itself.

The terms 'augmented reality' and 'projected reality' refer generally to a direct or indirect view of a physical real-world environment whose elements have been augmented by overlaid computer-generated perceptual information. This perceptual information may, in particular, be presented using visual modes; however other modalities such as auditory, haptic, somatosensory and olfactory modes may also be employed. Overlaid sensory information may be constructive or destructive and thereby act to additively compliment features present in the environment, or otherwise act to obfuscate and mask features present in the environment.

The terms 'point', 'reference point' or 'reference feature' as used herein refer generally to a visual indicator that serves, as part of two or more (usually three) reference points, for a registration process of a light projector onto a scene. Specifically, a reference point in a construction site is a pre-defined and pre-measured point whose exact absolute position is known, for example relative to an Earth centered frame of reference, usually to within a sub-centimeter tolerance. The point may, for example, be set or measured by a surveyor or similarly skilled worker, or alternatively it may be an easily defined point or feature such as a wall corner which appears both in site and on plan, whose position is known within a few centimeter's (preferably sub-centimeter) tolerance.

The term 'two-axis electro-optic deflection unit' as used herein refers generally to an arrangement operable provide a 2 Axis steering mechanism involving, for example, deflecting a laser beam in an X and Y direction to cover a two-dimensional (2D) plane in which the laser beam may be freely directed. The trajectory of the laser beam may typically be adjusted at a high speed, albeit may generally restricted to relatively narrow FOV. The deflection may be achieved using, for example, a two mirror arrangement where each mirror may be independently controlled and moved using a 'galvanometer scanner', 'MEMS scanner' or 'light scanner'.

The terms 'galvanometer scanner', 'MEMS scanner' or 'light scanner' as used herein refer generally to a device operable to control and move a set of mirrors in order to steer a laser beam. The steering of the beam may be two-dimensional and the mirrors may be used to generate a freely addressable motion, as in servo-controlled galvanometer scanners, sometimes referred to as vector scanning. To control the scanning motion, each scanner may require a rotary encoder, or other analogous form of angle and/or speed feedback, and control electronics that provide, for a desired angle or phase, the requisite electric current to the motor or galvanometer. A software system may be configured to control the scanning motion and, if 3D scanning is implemented, also the collection of the measured data. In order to position a laser beam in two dimensions, it is possible either to rotate one mirror along two axes—used mainly for slow scanning systems—or to reflect the laser beam onto two closely spaced mirrors that are mounted on orthogonal axes. Each of the two flat or polygonal mirrors may then be driven by a galvanometer or by an electric motor. In some embodiments the 2 axis deflection unit might comprise an electro optic spatial light modulator, such as: transmissive liquid crystal, reflective liquid crystal on silicon (LCOS), and Digital Light Processing (DLP) projectors.

The term 'RGBD' camera as used herein refers generally to a camera having the ability to capture distances and also RGB colors and/or gray scale color.

The term 'collimated beam of light' as used herein refers generally to a beam of light that comprises near parallel rays, and therefore will spread minimally as it propagates. A hypothetical perfectly collimated light beam, with no divergence, would in theory not disperse with distance; however such perfectly collimated light beams cannot be created in practice owing to diffraction effects. Laser beams are an example of a directional, collimated light beam. The divergence observed in high-quality laser beams is typically less than 1 milliradian.

The terms 'human-machine interface' (HMI) and 'user interface' as used herein refer generally to an input facility enabling interaction between humans and machines. The interface may, for example, refer to a graphical user interface (GUI) operable to receive instruction via an input device such as a mouse or touch screen. In the context of the present invention, interactions of this type allow for the effective operation and control of the machine, possibly in correspondence with information simultaneously fed back from the machine to the human in order to aid the operators' decision-making process.

The term 'image sensor' as used herein refers generally to a sensor that detects and conveys information used to make an image. It does so by converting the variable attenuation of light waves into signals, small bursts of current that convey the information. The waves may be light or other electromagnetic radiation.

Turning now to the detailed description, some embodiments of the present invention provide an Adaptive Projected Reality (APR) device for use by, for example, builders, appraisers, architects, engineers, surveyors, inspectors and the like. The APR device may be used to project desired construction plans onto a specific surface (or multiple surfaces) for the purposes of, for example, improving the accuracy and efficiency with which builders may progress a construction.

FIG. 1A, FIG. 1B, FIG. 1C, and FIG. 1D are high-level diagrams depicting a projector within a construction site in accordance with some embodiments of the present invention.

In FIG. 1A, projector 2A is positioned in a known position within a construction site and receives a portion of construction plan 1A to be projected on a specific surface 4A in the construction site. In such a case, the image projected 3B by the projector will reach the intended portion on the specific surface and result in a projected image 5A on a location, orientation, and scale as intended.

Figure 1B:
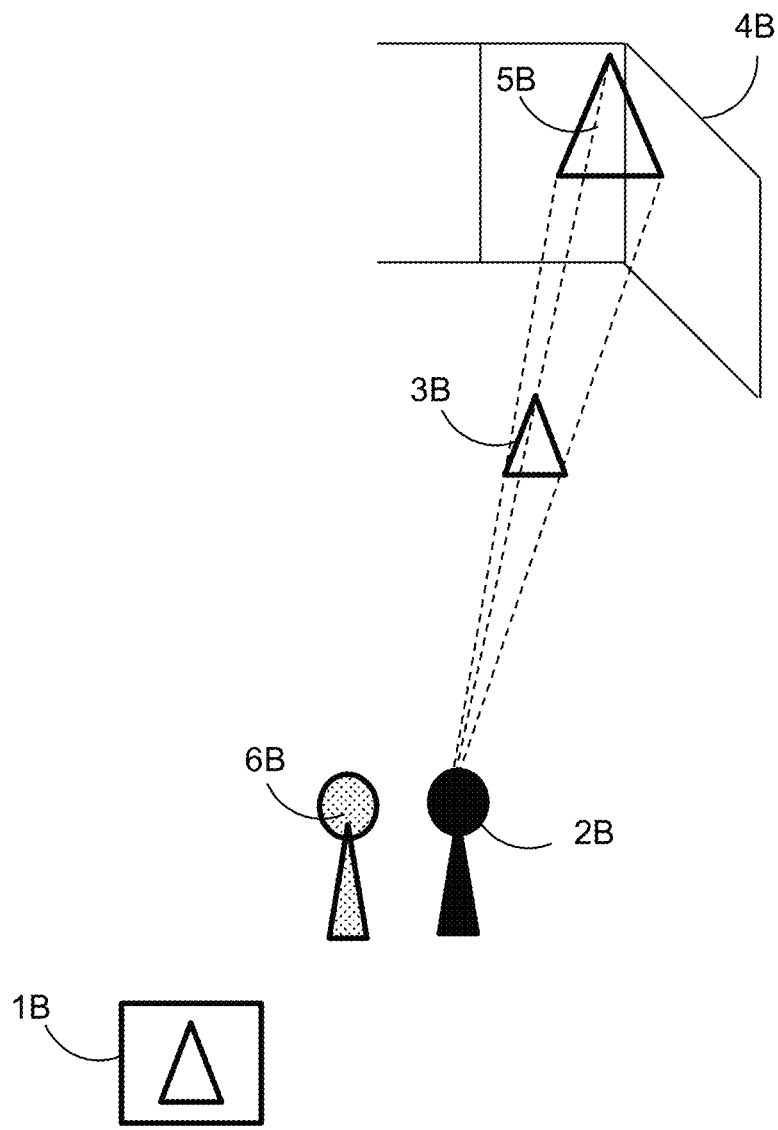

In FIG. 1B, projector 2B is positioned in a position within a construction site and receives a portion of construction plan 1A to be projected on a specific surface 4B in the construction site. In case that the position is erroneous and the correct position is 6B, then the image projected 3B by the projector will reach a different portion than intended on the specific surface and result in a projected image 5B on a location or orientation or even a scale that is different from intended.

Figure 1C:
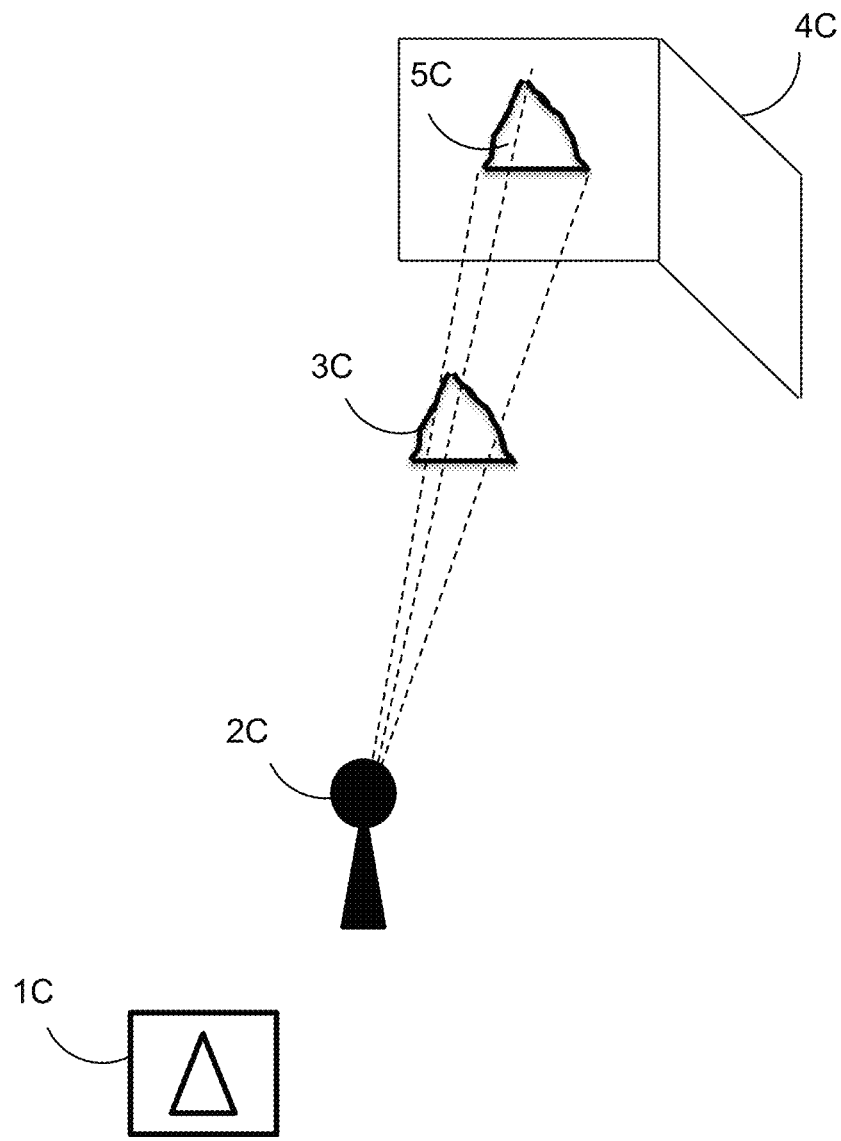

In FIG. 1C, projector 2C is positioned in a correct position within a construction site and receives a portion of construction plan 1C to be projected on a specific surface 4C in the construction site. In a case that projector 2C is faulty, the image projected 3C by the projector is deformed resulting in a projected image 5C to be deformed and different from intended.

Figure 1D:
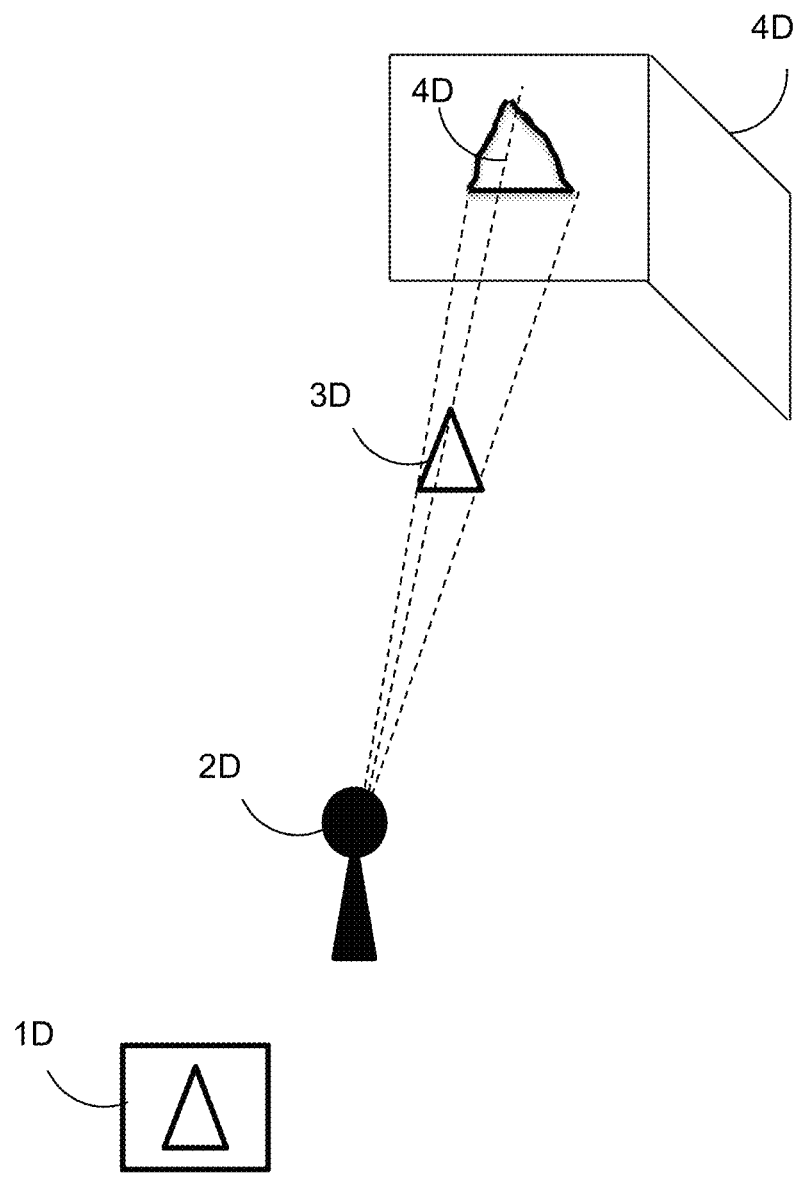
Figure 2:
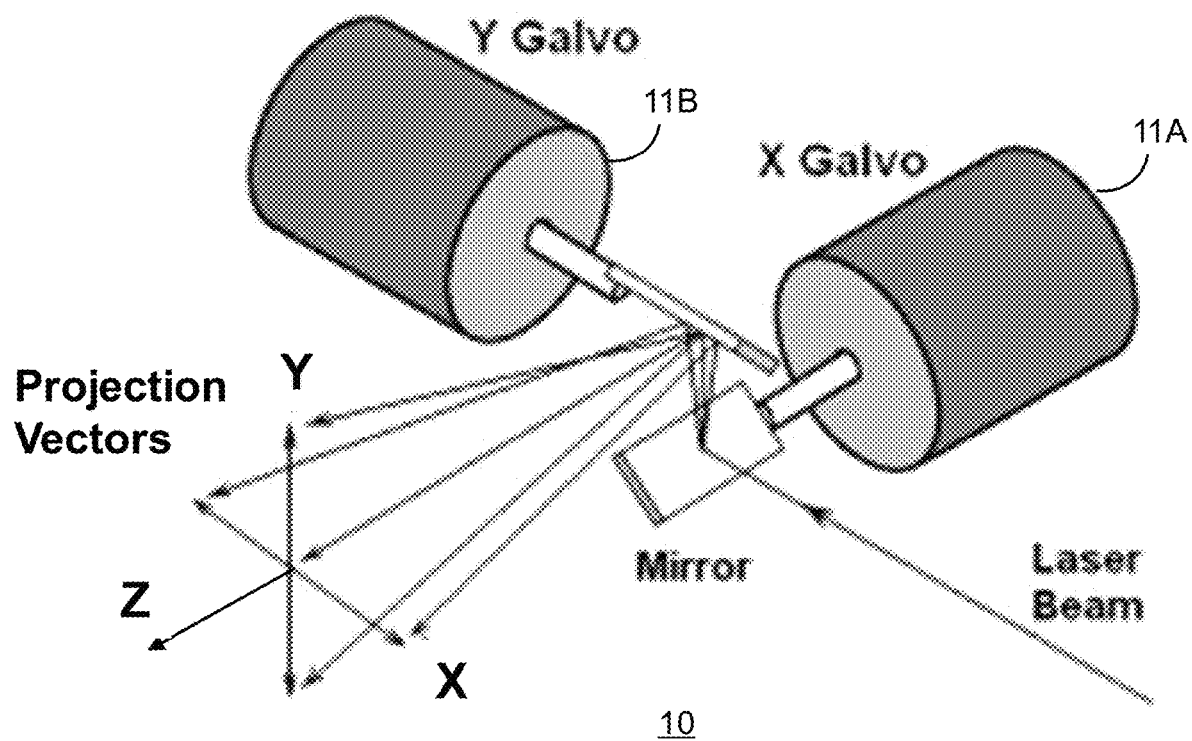
FIG. 2, FIG. 3A, FIG. 3B, FIG. 3C, FIG. 3D, FIG. 4, and FIG. 5 are high-level diagrams illustrating an exemplary laser projector system in accordance with some embodiments of the present invention.

In FIG. 1D, projector 2D is positioned in a correct position within a construction site and receives a portion of construction plan 1D to be projected on a specific surface 4C in the construction site. In case that the specific surface 4D was built incorrectly, then the image projected 3D by the projector will reach a geometrically different surface than intended and result in a projected image 5D to be deformed and different from intended.

In order to address the aforementioned deformations, in according to some embodiments of the present invention, a system for projecting a portion of a construction plan within a construction site, is provided herein. The system may include: a light projector configured to project an image associated with the portion of the construction plan onto at least one specific surface within the construction site, by projecting a set of vectors, starting at an XYZ position within the light projector and ending at respective XYZ coordinates; at least one sensor configured to record at least some of: a set of XYZ coordinates of the at least one specified surface, and a set of XYZ coordinates of the image as projected on the specific surface; and a computer processor configured to: generate, based on the construction plan, an "as planned" model representing surfaces and elements as planned in the construction plan; derive, from the construction plan, an intended projection portion which comprises visual content and dimensional data intended to be projected on the specific surface; calculate XYZ coordinates for the intended projection portion, based on the "as planned" model and the XYZ position of the light projector; compare the XYZ coordinates recorded by the sensor with the XYZ coordinates for the intended projection portion, to detect respective XYZ displacements; generate a modified projection portion based on the detect respective XYZ displacements, wherein the light projector is further configured to project said modified projection portion onto the specific surface.

In another embodiment, a system for projecting a portion of a construction plan within a construction site is provided herein. The system may include: a light projector configured to project an image associated with the portion of the construction plan onto at least one specific surface within the construction site, by projecting a set of vectors, starting at an XYZ position within the light projector and ending at respective XYZ coordinates; at least one sensor configured to record at least some of: a set of XYZ coordinates of the at least one specified surface, and a set of XYZ coordinates of the image as projected on the specific surface; and a computer processor configured to: generate, based on the construction plan, and the XYZ coordinates recorded by the sensor, an "as built" model representing surfaces and elements as built in the construction site; derive, from the construction plan, an intended projection portion which comprises visual content and dimensional data intended to be projected on the specific surface; calculate XYZ coordinates for the intended projection portion, based on the "as built" model and the XYZ position of the light projector; wherein the light projector is further configured to project the intended projection portion onto the specific surface with the calculated XYZ coordinates for the intended projection portion.

FIG. 2, FIG. 3A, FIG. 4, and FIG. 5 are high-level diagrams illustrating an exemplary laser projector system or survey tool 20 in depicting an exemplary architecture for implementing the aforementioned systems accordance with some embodiments of the present invention. The laser projection system 20 includes a laser projector arrangement 16 including a two-axis electro-optic deflection unit 10 and at least one light source, both of which are mounted 19 onto a moveable platform 12. The light source is preferably a low divergence light source operable to emit collimated beams of light. The two-axis electro-optic deflection unit is preferably formed from a set of cooperating mirrors 17, 18 and galvanometers 11 and, optionally, includes a 2D camera and/or depth camera 21. The moveable platform 12 may be connected to and/or mounted on a support structure 15, such as a tripod, stand, anchor, mounting, vehicle, robot or the like. The support structure may be configured to remain stationary relative to a construction site 26. Alternatively, the support structure may be configured to move manually or in a motorized way, it might also move in a predetermined or derivable pattern (e.g., using proximity sensors, camera, motion sensors or the like) relative to the construction site 26. Moveable platform 12 may further comprise mechanisms to pan 14 and/or tilt 13 the two-axis electro-optic deflection mounted thereon relative to the support structure 15. The laser projection system may further include a computer controller and a set of reference features/points 22 which are positioned within the construction site 26 and, optionally, appear on the plan, for use in establishing the tool's exact position (usually within a sub-centimeter tolerance) and orientation relative to the construction site (i.e., within the three-dimensional space). The projection system 20 may be aligned semi-manually by pointing a laser beam 25 emitted by the light source to the reference features/points 22 and using the bearing/steering angle reading 23 of the projection system 20 relative to a part of the survey tool 24 to register the system's position. Range readings may also be obtained by directing the laser beam 25 and measuring the 'time of flight' with a laser distance meter, which optionally may be incorporated in the projection system 20. To achieve bearing and/or range localization, the system may use an angle 23, a range of laser 25 or a combination of both to compute its position and orientation where localization based on bearing angle involves a triangulation computation and where localization based on range involves a trilateration computation. It may also be aligned automatically by scanning the scene with laser beams, which may be reflected by one or more retro reflectors (positioned on the reference features/points) back along the same optical path to a photodetector, which in turn allows the system to "read" the position.

Once the projector system 20 verifies its position in the build space, it may be operated to accurately and adaptively project the outline of features and elements for assisting in the construction process. System software may also be included to store imported digital plans or patterns which outlines of the features and elements (walls, pipes, air condition and the like) and adjust the scale and shape (orientation) of the projected outline to account for the system's three-dimensional position and/or orientation within the build space and/or its position and/or orientation relative to surfaces on which projector projects onto.

The projector arrangement 16 and moveable platform 12 cooperate to facilitate beam steering and comprises accurate beam angle position sensors (mirror angle/speed sensor or similar) and also incorporate a laser distance meter in the galvanometric scanner. For each reference feature/point, a user may aim the laser/light beam 14 at the point 22. A computer processor (CPU) may then calculate accurate bearing/steering angle data relative to support structure 15 (or other part of the survey tool) from both the projector and the pan 14 and tilt 13 mechanisms of the moveable platform 12 (utilizing an angular encoder, inclination sensor, accelerometer, gyroscope etc.) and may also acquire range data from a laser distance meter. The CPU may then calculate the position and orientation of the projector system 20 relative to the build space/construction site 26 based on at least one of the steering angle and the distance.

Based on position, orientation and pre-defined digital drawings, the projector system 20 may project plans such as, for example, a template or blueprint, and related information, accurately and in alignment with surfaces within the construction site 26. The light source and the two-axis electro-optic deflection unit 10 operate under common control of the computing system to register their respective locations using the array of reference points/targets/work object features, converting all location information into a common coordinate system, and projecting information on the work surface with directional light beams using the common coordinate system.

According to some embodiments of the invention, there is provided a system comprising a 2D light projector attached to a two-axis electro-optic deflection unit 10. The pan 14 and tilt 13 mechanisms of the moveable platform 12 may steer the projector in different orientations and enhance the projector coverage. A control system and user interface may also be provided to control the projector and, optionally, the pan 14 and tilt 13 mechanisms. The pan 14 and tilt 13 mechanism may further comprise accurate angle position sensors (encoder) or other similar methods of reading angle data.

Figure 3A:
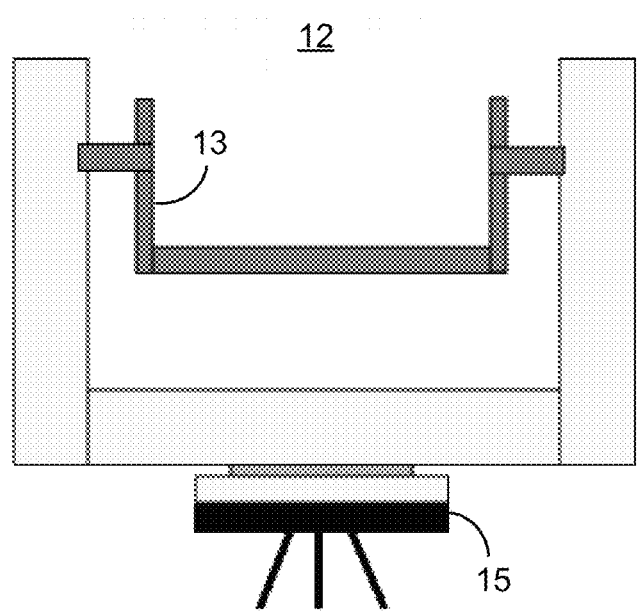
Figure 3B:
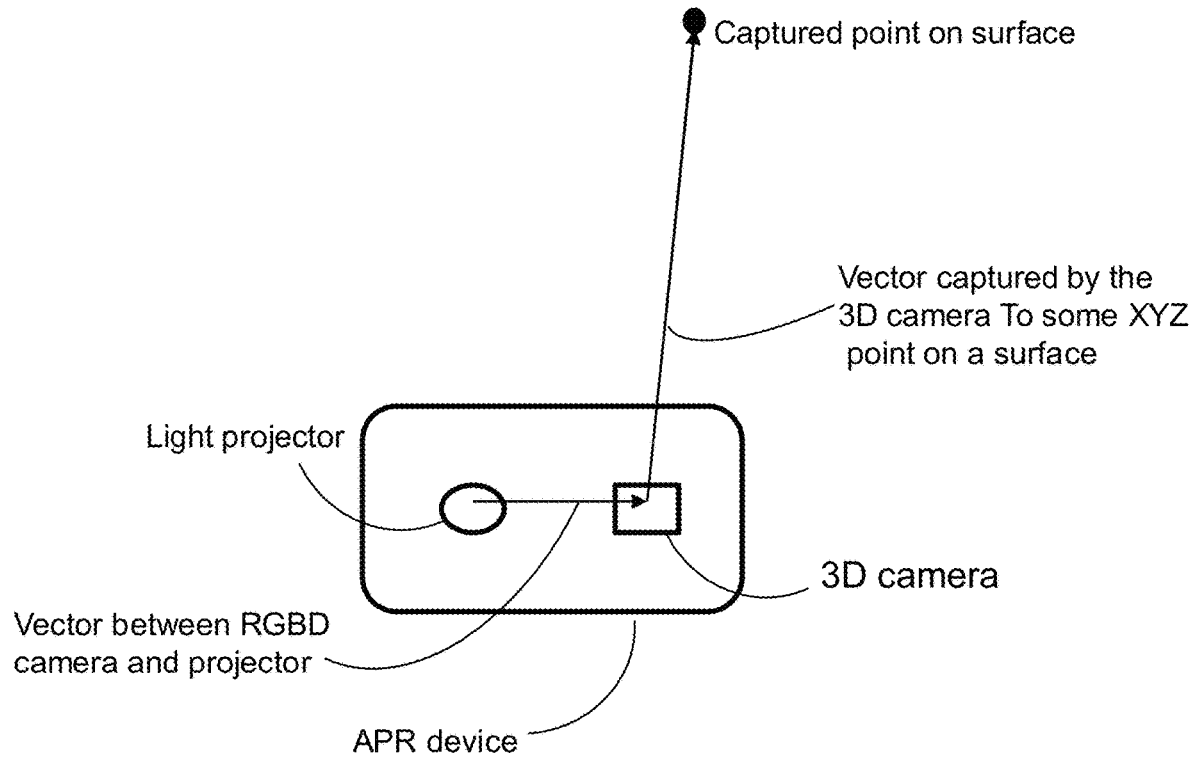
Figure 3C:
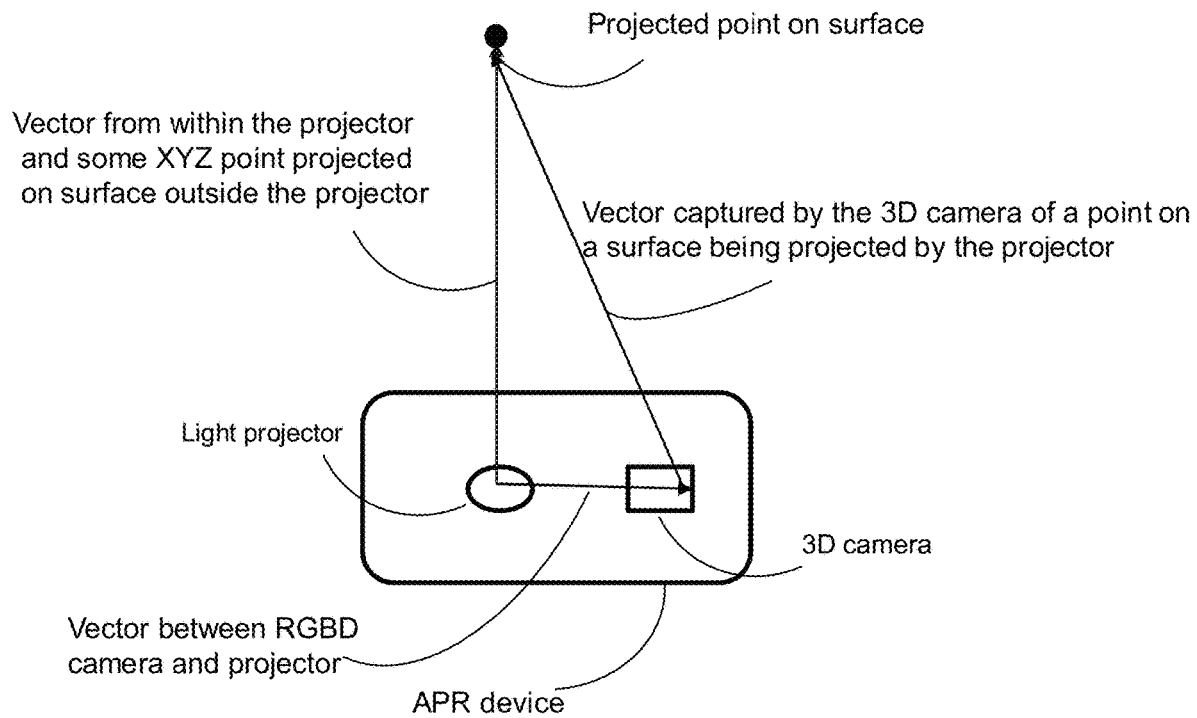
Figure 3D:
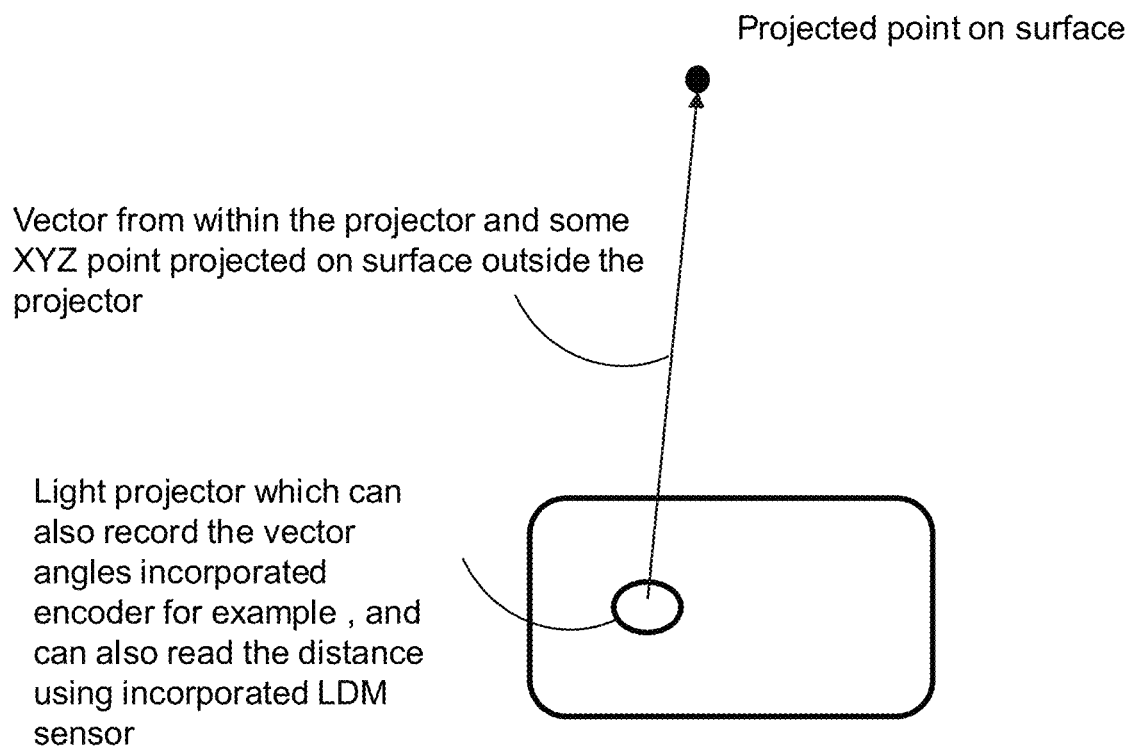
Figure 4:
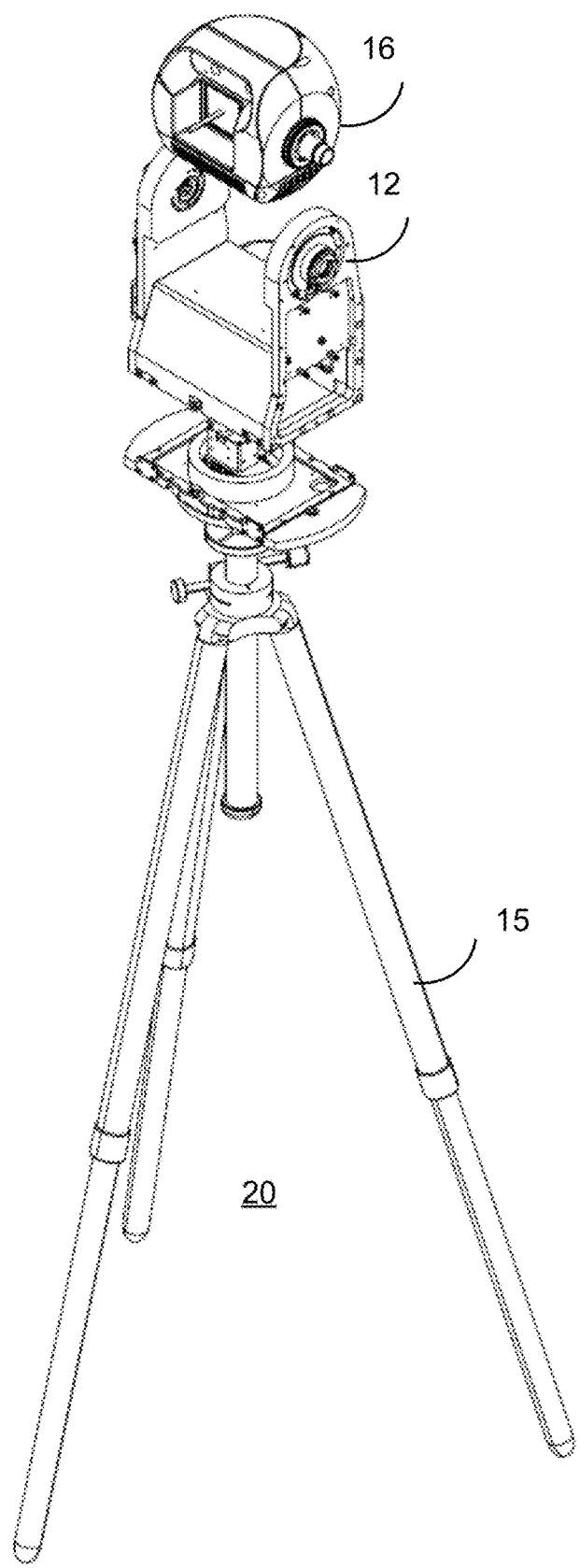
Figure 5:
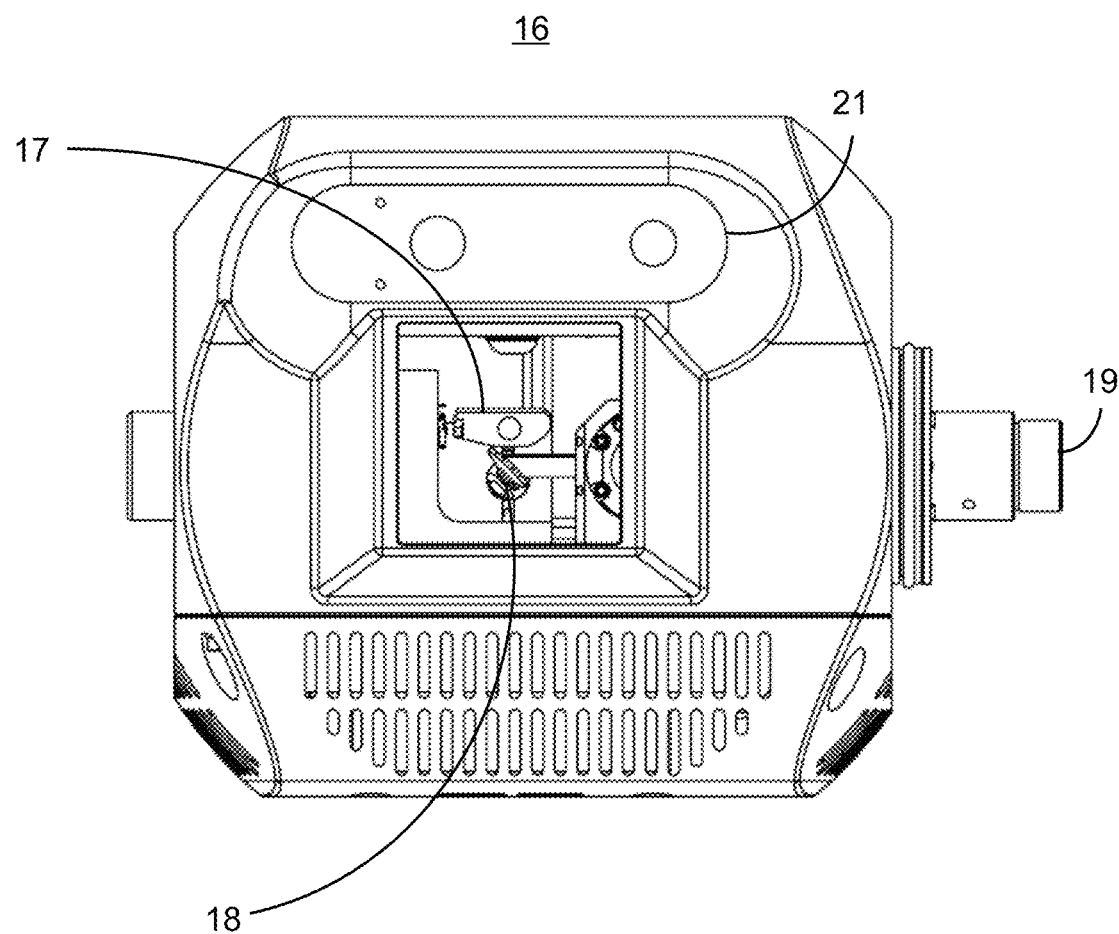

FIG. 3B shows how a 3D camera (e.g. an RGBD camera) can derive a vector towards a captured point on a surface and then by obtaining a vector between the 3D camera and the projector, derive the vector from the projector to the point. FIG. 3C sows how the 3D camera derives the vector to a point projected by the vector and based on the vector from the projector to the 3D camera, the vector from the projector to the projected point is calculated. FIG. 3D shows how, without a 3D camera, but by using the projector as an LDM, the vector from the light projector to the projected point is being calculated.

Figure 6:
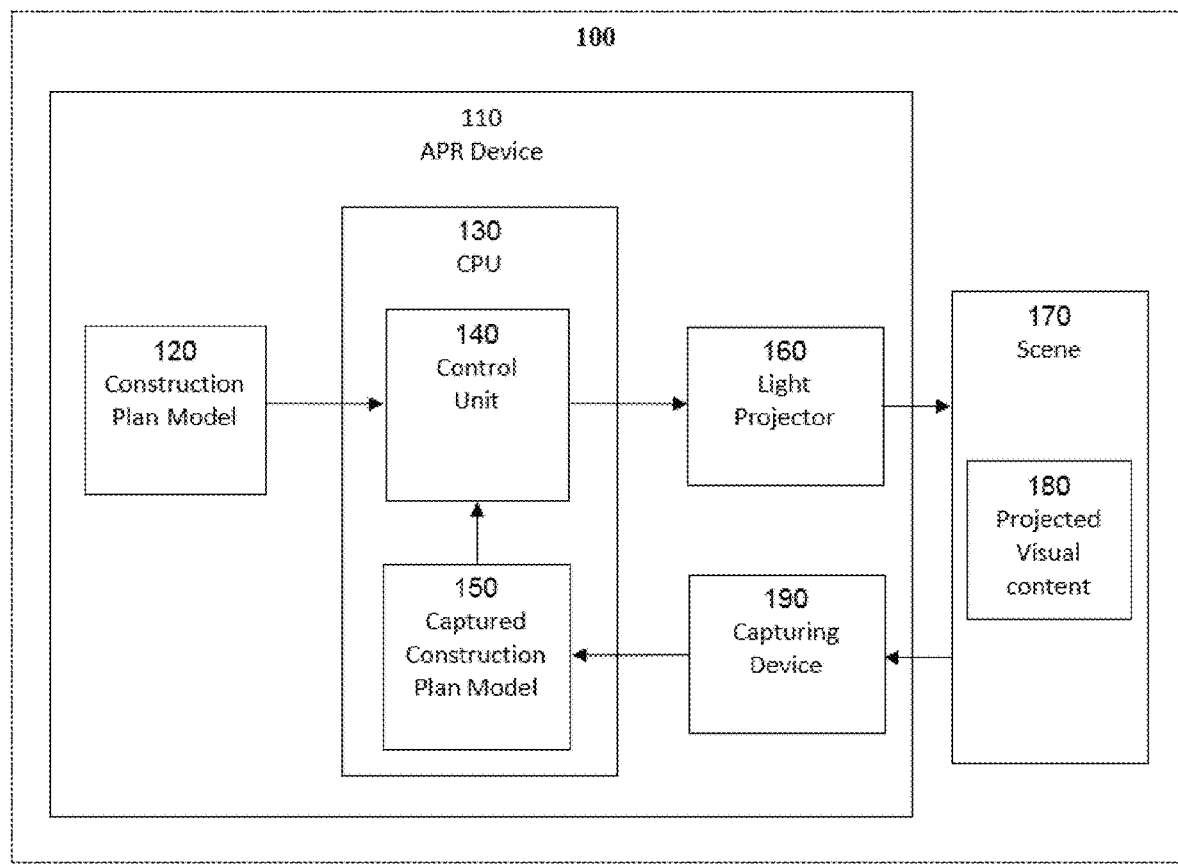
FIG. 6 is a high-level block diagram illustrating a system in accordance with embodiments of the present invention.

FIG. 6 is a high-level diagram illustrating a non-limiting system 100 configured to allow control of an APR device according to embodiments of the invention. System 100 may include an APR device 110 as detailed above. The APR device may include construction plan model 120 that describes the projection model and/or the scene model. The APR device may also include a light projector 160 that projects visual content 180 over a scene 170. The APR device may also include a capturing device 190 that captures the projected visual content 180 within the scene 170. The APR device may also include a computer processor unit (CPU) 130 that receives information form the capturing device 190 and construction plan model 120, and outputs information to the light projector 160. The CPU 130 may include a control unit 140 that compares the construction plan model 120 and the captured construction plan model 150 and generates the output from the light projector 160. The captured construction plan model 150 is a model of the captured construction plan that was captured by the capturing device 190.

In some embodiments, the capture device 190 may be two-dimensional (2D) camera, three-dimensional (3D) RGB camera or any other device that is able to capture images of both the scene 170 and the projected visual content 180.

Figure 7:
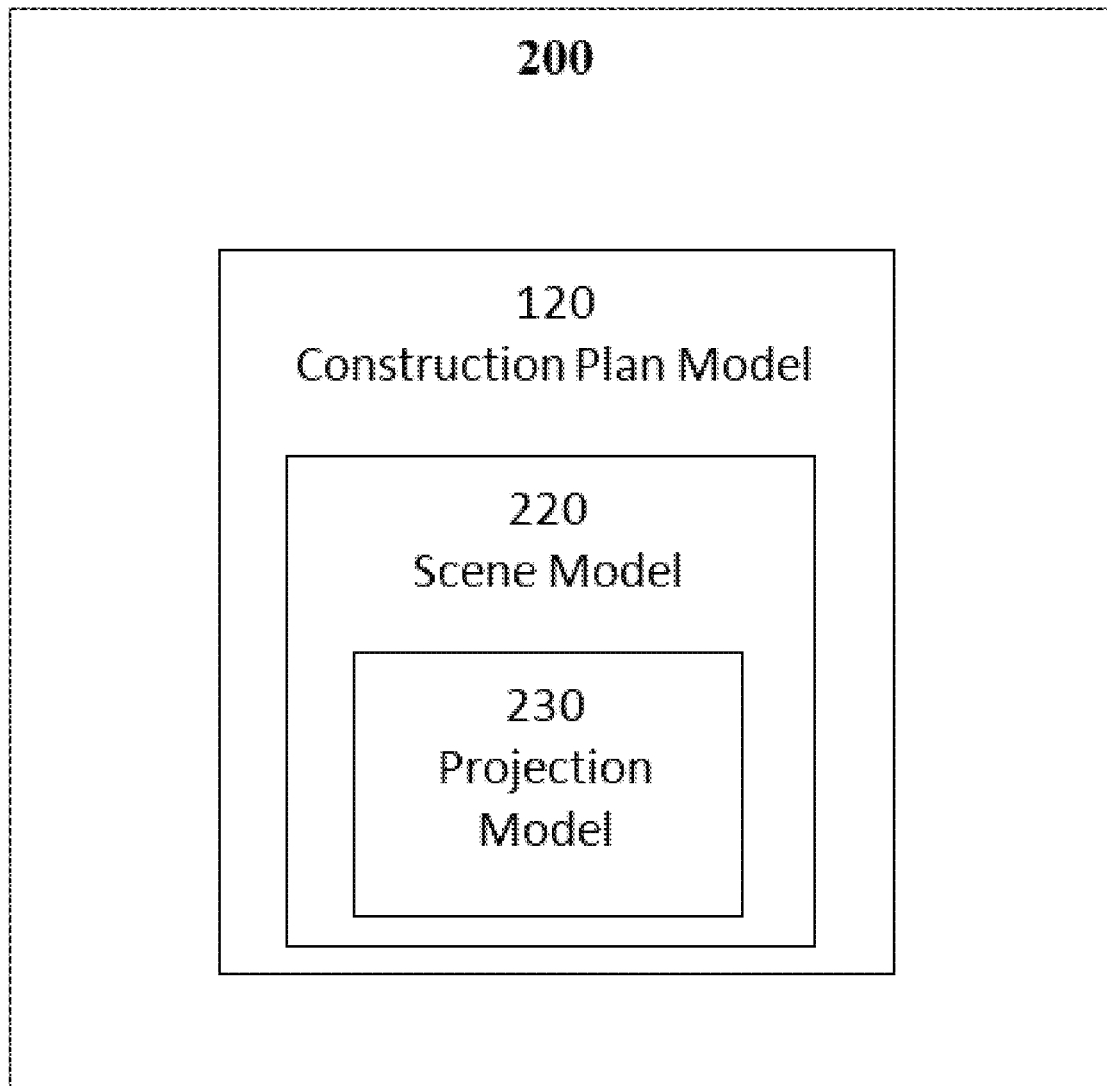
FIG. 7 is a diagram illustrating an aspect in accordance with some embodiments of the present invention.

FIG. 7 depicts the construction plan model 120. The construction plan model 120 may include a scene model 220 and a projection model 230. The scene model 220 may be represented by a set of data structures, a CAD file or other ways to model a physical scene. The projection model 230 may also be represented by a set of data structures, a CAD file or other ways to model a desired projection.

Figure 8:
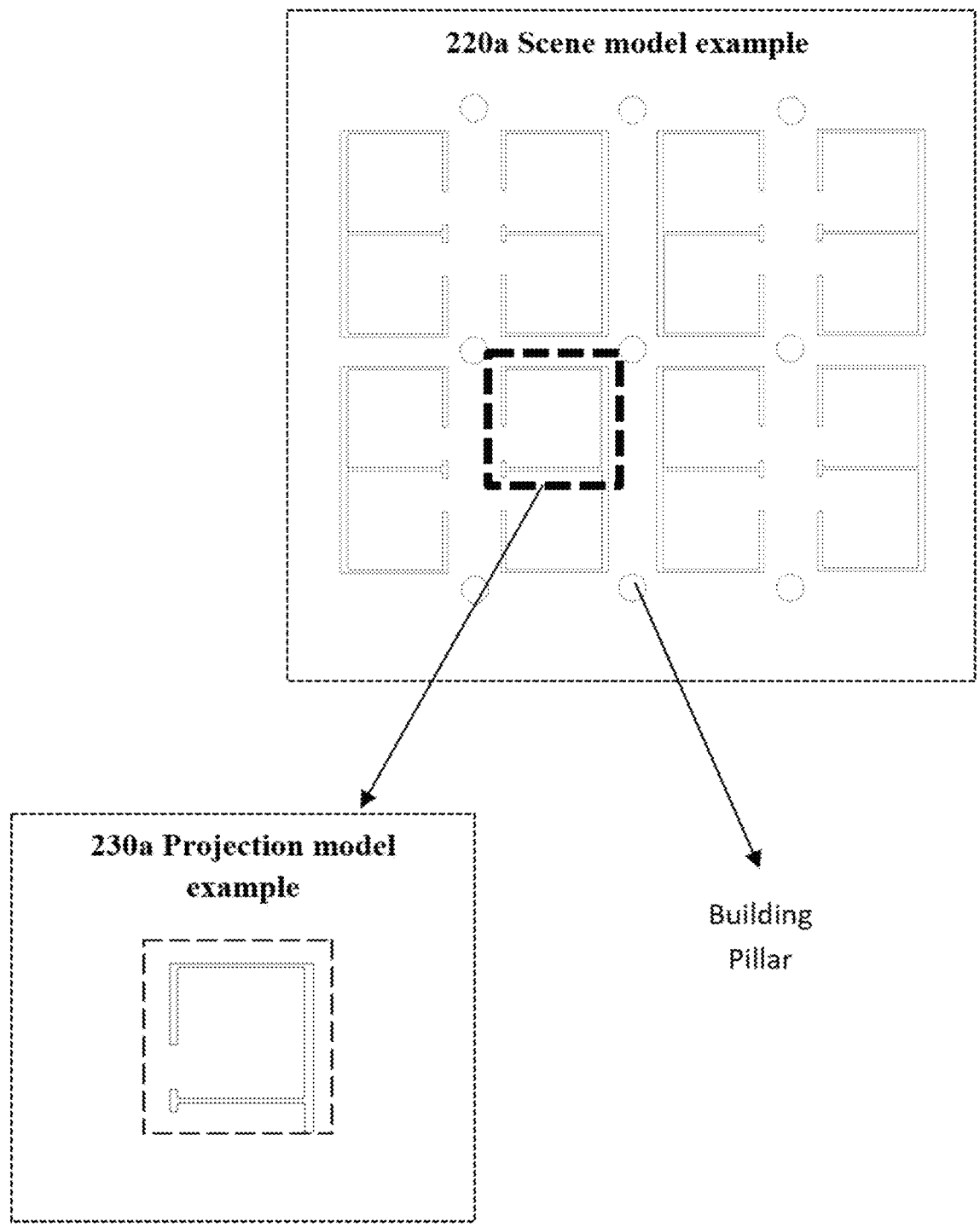
FIG. 8 is a diagram illustrating another aspect in accordance with some embodiments of the present invention.

FIG. 8 illustrates a realistic example for the model of FIG. 7. A partition floor plan, that may be part of the construction plan model 120 is shown. The scene model example 220a shows a plan including a 16-room partition along with the position of a set of building pillars. The projection model example 230a includes one single room that may be projected by the APR device on the real scene.

In some embodiments, the projection model 230 may be either automatically extracted from a construction plan or selected manually by a user, via a user interface.

Figure 9:
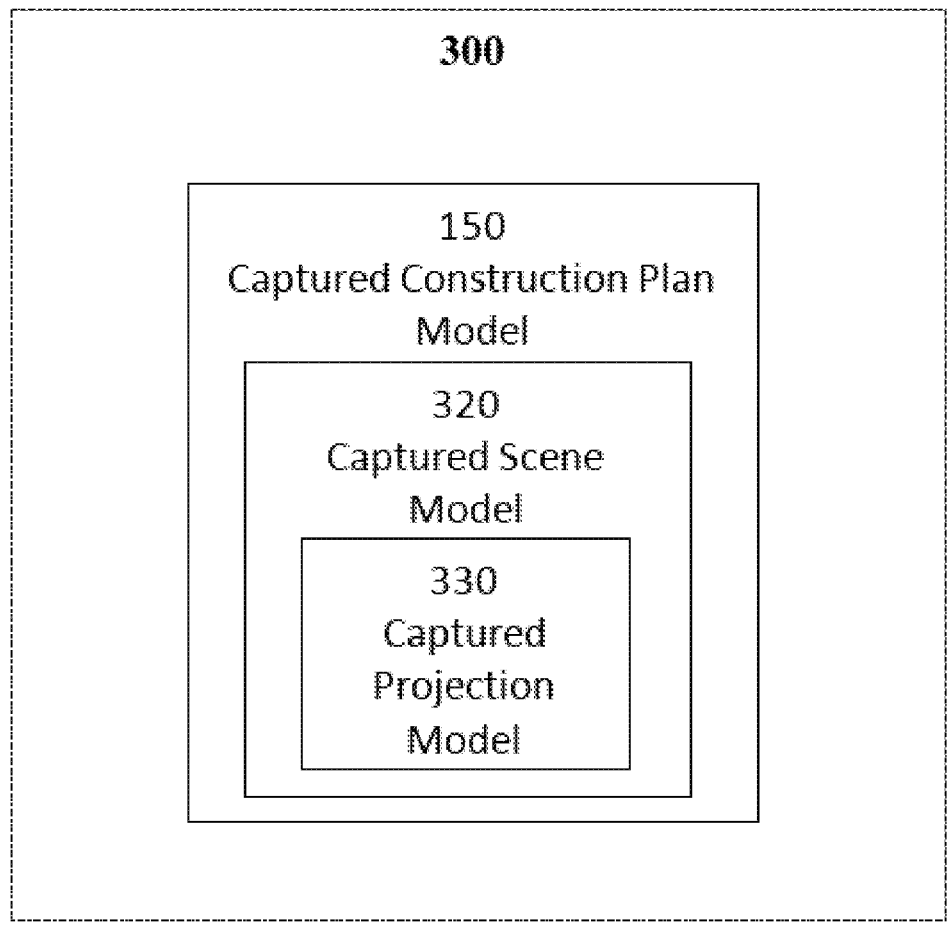
FIG. 9 is a diagram illustrating yet another aspect in accordance with some embodiments of the present invention.

FIG. 9 depicts the captured construction plan model 150. The captured construction plan model 150 may include a captured scene model 320 and a captured projection model 330. The captured scene model 320 may be represented by a set of data structures, a CAD file or other ways to model the captured physical scene. The captured projection model 330 may also be represented by a set of data structures, a CAD file or other ways to model the captured desired projection.

In some embodiments, the captured scene model 320 may be obtained from either a real plan (as designed) or a build plan, taken from an APR build.

In some embodiments, if the captured scene model 320 is significantly different from the scene model 220, above a predetermined threshold error, a flag may be raised to inform the user about it.

In some embodiments, if the captured projection model 330 is significantly different from the projection model 230, above a predetermined threshold error, a flag may be raised to inform the user about it.

In some embodiments, the construction plan format may be dwg, svg, rvt, ifc, pdf, txt or any suitable other file formats.

Figure 10:
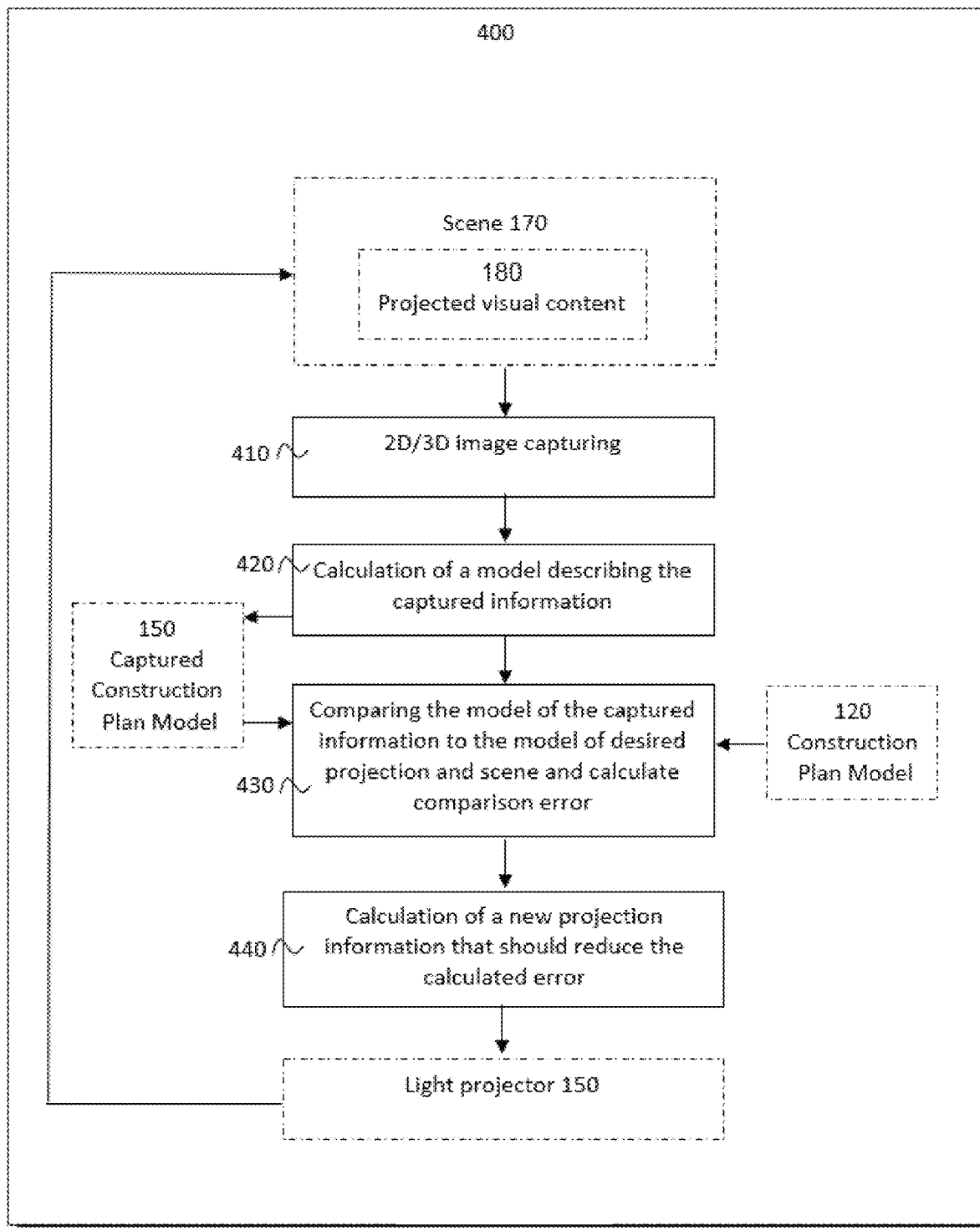
FIG. 10 is a high-level flowchart diagram illustrating a method in accordance with embodiments of the present invention.

FIG. 10 is a high-level block-diagram illustrating a non-limiting exemplary control unit operation according to embodiments of the invention. In some embodiments, step 410 comprises capturing the projected visual content 180 and/or the scene 170 by a capturing device. In step 420 a calculation of a model describing the captured information is made to produce a captured construction plan model 150. In step 430, a comparison is made between the construction plan model 120 and the captured construction plan model 150. As a result, a comparison error metric is calculated to describe the accuracy of the projection. In step 440, new projection information is calculated, aiming to reduce the comparison error, and thus making the projection more accurate. The projection information is sent to the light projector 160. The operation of the control unit is repeated until a desired comparison error is achieved.

In some embodiments, the error value, calculated in step 430, between the construction plan model 120 and the captured construction plan model 150 can be calculated using methods like Euclidean distance, recursive estimation or other similar methods.

Figure 11:
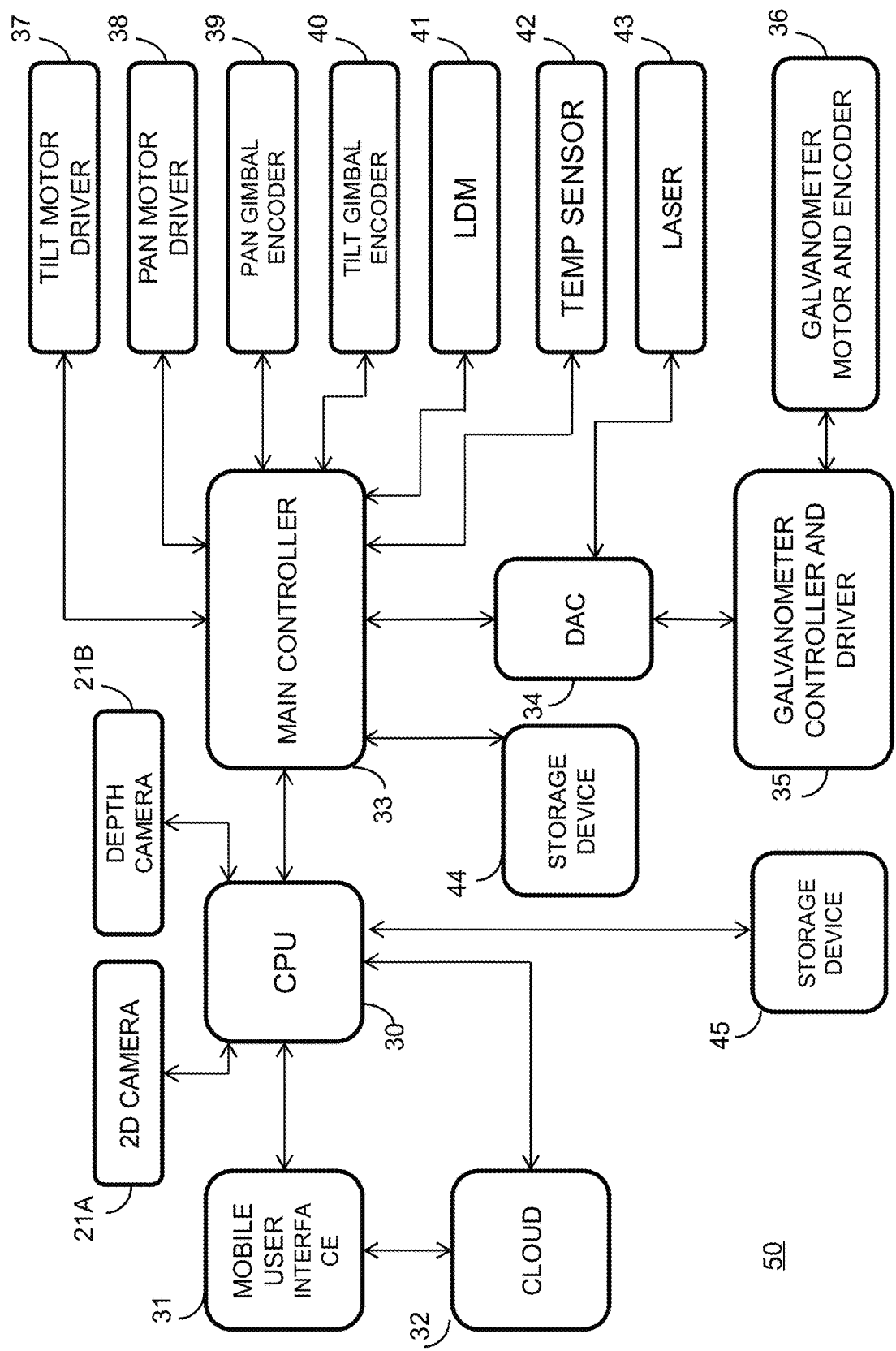
FIG. 11 is a high-level block diagram illustrating a system in accordance with embodiments of the present invention.

FIG. 11 is high-level block diagrams illustrating non-limiting system arrangements 50, 100 in accordance with embodiments of the invention. System 50 for adjusting the projection of a projector may include a central processing unit 30 operable to execute software and algorithms required to perform the operations explained throughout this disclosure. Operational instructions and commands may be issued to the system 50 by, for example, an operator over wired or wireless communication mediums using one or both of mobile user interface 31 and/or the cloud 32 and/or any storage device. Central processing unit 30 may be operably connected to a 2D camera 21A and/or a depth camera 21B and further to a main controller 33. Main controller 33 may be operably connected to motor drivers 37, 38 and encoders 39, 40 of the pan 14 and tilt 13 mechanisms of the moveable platform 12. Main controller may additionally be operably connected to one or more temperature sensors 42 and one or more laser distance measuring devices 41. Galvanometers 11 of the two-axis electro-optic deflection unit 10 may be controlled and measured by main controller 33, via a digital to analogue converter (DAC) 34, using galvanometer controller and driver 35 and galvanometer motor and encoder 36. Laser emitter 43 may additionally be controlled by main controller 33 via DAC 34. Storage devices 44 and 45 are connected to the CPU and controller respectively and provide the relevant construction plans and other data and instructions required for the operation of the system.

Figure 12:
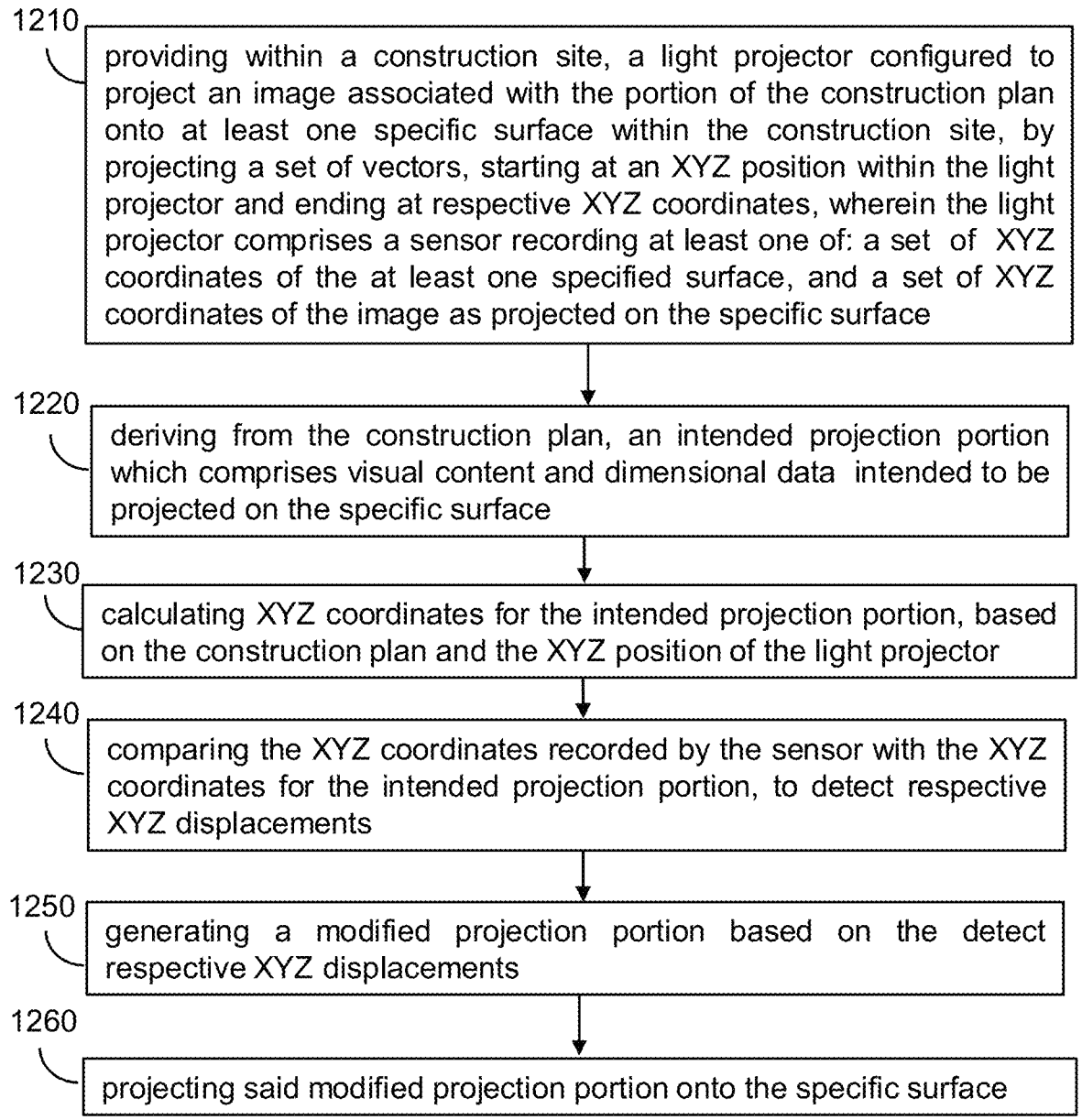
FIG. 12 is a high-level flowchart diagram illustrating a method in accordance with embodiments of the present invention.

FIG. 12 is a high-level flowchart diagram illustrating a method 1200 in accordance with embodiments of the present invention. Method 1200 of projecting a portion of a construction plan within a construction site, and may include the following steps: providing within a construction site, a light projector configured to project an image associated with the portion of the construction plan onto at least one specific surface within the construction site, by projecting a set of vectors, starting at an XYZ position within the light projector and ending at respective XYZ coordinates, wherein the light projector comprises a sensor recording at least some of: a set of XYZ coordinates of the at least one specified surface, and a set of XYZ coordinates of the image as projected on the specific surface 1210; deriving from the construction plan, an intended projection portion which comprises visual content and dimensional data intended to be projected on the specific surface 1220; calculating XYZ coordinates for the intended projection portion, based on the construction plan and the XYZ position of the light projector 1230; comparing the XYZ coordinates recorded by the sensor with the XYZ coordinates for the intended projection portion, to detect respective XYZ displacements 1240; generating a modified projection portion based on the detect respective XYZ displacements; and projecting said modified projection portion onto the specific surface 1250.

FIG. 13 is a high-level flowchart diagram illustrating a method 1300 in accordance with embodiments of the present invention. Method 1300 of projecting a portion of a construction plan within a construction site may include the following steps: providing within a construction site, a light projector configured to project an image associated with the portion of the construction plan onto at least one specific surface within the construction site, by projecting a set of vectors, starting at an XYZ position within the light projector and ending at respective XYZ coordinates, wherein the light projector comprises a sensor recording at least some of: a set of XYZ coordinates of the at least one specified surface, and a set of XYZ coordinates of the image as projected on the specific surface 1310; generating, based on the construction plan, and the XYZ coordinates recorded by the sensor, an "as built" model representing surfaces and elements as built in the construction site 1320; deriving, from the construction plan, an intended projection portion which comprises visual content and dimensional data intended to be projected on the specific surface 1330; calculating XYZ coordinates for the intended projection portion, based on the "as built" model and the XYZ position of the light projector 1340; and projecting the intended projection portion onto the specific surface with the calculated XYZ coordinates for the intended projection portion 1350.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system".

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A system for projecting a portion of a construction plan within a construction site, the system comprising:
    a light projector configured to project an image associated with the portion of the construction plan onto at least one specific surface within the construction site, by projecting a set of vectors, starting at an XYZ position within the light projector and ending at respective XYZ coordinates;
    at least one sensor configured to record at least some of: a set of XYZ coordinates of the at least one specified surface, and a set of XYZ coordinates of the image as projected on the at least one specific surface; and
    a computer processor configured to:
        derive, from the construction plan, an intended projection portion which comprises visual content and dimensional data intended to be projected on the at least one specific surface which also appears in the construction plan;
        calculate XYZ coordinates for the intended projection portion, based on the construction plan and the XYZ position of the light projector;
        compare the XYZ coordinates recorded by the sensor with the XYZ coordinates for the intended projection portion, to detect respective XYZ displacements;
        generate a modified projection portion based on the detected respective XYZ displacements,
    wherein the light projector is further configured to project said modified projection portion onto the specific surface,
    wherein the light projector is further configured to steer a light beam between at least some of the vectors, thereby projecting the image by scanning the light beam, and
    wherein the computer processor is configured to apply selective modeling of the specified surface by instructing the projector to scan only a portion of the at least one specified surface.

2. The system according to claim 1, wherein the dimensional data comprises dimensions and scale of the projected element and optionally the position and orientation of the projected element.

3. The system according to claim 1, wherein the at least one sensor comprises a laser distance meter (LDM) and wherein the distance parameters comprise distances between specified points in the at least one specific surface and the LDM.

4. The system according to claim 1, wherein the at least one sensor comprises a 3D camera and wherein distance measurements recording comprise a 3D model of the at least one specific surface based on 3D images obtained from the 3D camera.

5. The system according to claim 1, wherein the at least one sensor comprises a 2D camera and wherein the distance parameters comprise a 3D model of the at least one specific surface based on a set of 2D images obtained from the 2D camera from different predefined positions.

6. The system according to claim 1, wherein the at least one sensor comprises an RGBD camera and wherein the set of XYZ coordinates comprises a 3D model with color of the at least one specific surface based on 3D images with color obtained from the RGBD camera.

7. The system according to claim 1, wherein the light projector and the computer processor repeats their operation until the respective XYZ displacements are minimized.

8. The system according to claim 1, wherein the light projector is further configured to project a known pattern on the at least one specific surface and wherein the sensor is further configured to sense the known pattern from a different XYZ position compared with the XYZ position of the projector, wherein the computer processor is further configured to calculate surface model of the at least one specified surface by comparing the known pattern and the sensed pattern, wherein the computer processor is further configured to generate the modified projection portion based on at least some of a set of XYZ coordinates of the at least one surface model.

9. The system according to claim 1, wherein the portion of the at least one specified surface is based on the content of the intended projection.

10. The system according to claim 1, wherein computer processor is configured to optimize the operation of the projector on at least one of: projecting path, scanning speed, and light power.

11. The system according to claim 1, wherein computer processor is configured to adjust the XYZ coordinates for the intended projection portion and/or the movement path between the points and/or speed between the points and/or light power between the points to optimize between projector visibility and eye safety so as to comply with an amount of laser energy per time interval as described in eye safety standards.

12. The system according to claim 1, wherein computer processor is configured to optimize the operation of the projector on at least one of: projecting path, and scanning speed, scanning accuracy by optimizing the XYZ coordinates for the intended projection portion and/or the movement path between the points and/or speed between this points to minimize at least one of: the movement length between point, the movement time between points, the accuracy of the movement path relative to the intendent movement.

13. The system according to claim 1, wherein the light projector and the computer processor implement an automatic re-alignment of projected element based on optimization of the construction plan and the XYZ coordinates of the at least one specified surface.

14. The system according to claim 1 where the computer processor is further configured to update the construction plan according to instructions by a user.

15. The system according to claim 1, wherein the projector is further configured to project the updated image based on the updated and stored construction plan.

16. The system according to claim 1, wherein the projector is further configured to project the updated image based on the updated construction plan as it is being updated.

17. A system for projecting a portion of a construction plan within a construction site, the system comprising:
  a light projector configured to project an image associated with the portion of the construction plan onto at least one specific surface within the construction site, by projecting a set of vectors, starting at an XYZ position within the light projector and ending at respective XYZ coordinates;
  at least one sensor configured to record at least some of: a set of XYZ coordinates of the at least one specified surface, and a set of XYZ coordinates of the image as projected on the at least one specific surface; and
  a computer processor configured to:
    derive, from the construction plan, an intended projection portion which comprises visual content and dimensional data intended to be projected on the at least one specific surface which also appears in the construction plan;
    calculate XYZ coordinates for the intended projection portion, based on the construction plan and the XYZ position of the light projector;
    compare the XYZ coordinates recorded by the sensor with the XYZ coordinates for the intended projection portion, to detect respective XYZ displacements;
    generate a modified projection portion based on the detected respective XYZ displacements,
  wherein the light projector is further configured to project said modified projection portion onto the specific surface,
  wherein the light projector comprising:
  a support structure;
  a moveable platform connected to the support structure, wherein the moveable platform is configured to rotate at least one two-axis electro-optic deflection unit mounted on the moveable platform; and
  at least one light source coupled to the two-axis electro-optic deflection unit configured to project a light beam, wherein steering of the light beam is carried out by operating at least one of: the two-axis electro-optic deflection unit, and the moveable platform,
  wherein the computer processor is configured to apply selective modeling of the specified surface by instructing the projector to scan only a portion of the at least one specified surface.

18. A system for projecting a portion of a construction plan within a construction site, the system comprising:
  a light projector configured to project an image associated with the portion of the construction plan onto at least one specific surface within the construction site, by projecting a set of vectors, starting at an XYZ position within the light projector and ending at respective XYZ coordinates;
  at least one sensor configured to record at least some of: a set of XYZ coordinates of the at least one specified surface, and a set of XYZ coordinates of the image as projected on the at least one specific surface; and
  a computer processor configured to:
    derive, from the construction plan, an intended projection portion which comprises visual content and dimensional data intended to be projected on the at least one specific surface which also appears in the construction plan;

calculate XYZ coordinates for the intended projection portion, based on the construction plan and the XYZ position of the light projector;

compare the XYZ coordinates recorded by the sensor with the XYZ coordinates for the intended projection portion, to detect respective XYZ displacements;

generate a modified projection portion based on the detected respective XYZ displacements, wherein the light projector is further configured to project said modified projection portion onto the specific surface, wherein the light projector is further configured to steer a light beam between at least some of the vectors, thereby projecting the image by scanning the light beam, wherein the light projector and the computer processor implement an automatic re-alignment of projected element based on measuring the XYZ displacements.

19. A system for projecting a portion of a construction plan within a construction site, the system comprising:

a light projector configured to project an image associated with the portion of the construction plan onto at least one specific surface within the construction site, by projecting a set of vectors, starting at an XYZ position within the light projector and ending at respective XYZ coordinates;

at least one sensor configured to record at least some of:
a set of XYZ coordinates of the at least one specified surface, and a set of XYZ coordinates of the image as projected on the on the at least one specific surface; and a computer processor configured to:
generate, based on the construction plan, and the XYZ coordinates recorded by the sensor, an "as built" model representing surfaces and elements as built in the construction site;

derive, from the construction plan, an intended projection portion which comprises visual content and dimensional data intended to be projected on the at least one specific surface which appears in the construction plan and/or in the "as built" model;

calculate XYZ coordinates for the intended projection portion, based on the "as built" model and the XYZ position of the light projector, wherein the light projector is further configured to project said intended projection portion onto the at least one specific surface, wherein the light projector is further configured to steer a light beam between at least some of the vectors, thereby projecting the image by scanning the light beam, wherein the computer processor is configured to apply selective modeling of the specified surface by instructing the projector to scan only a portion of the at least one specified surface.

\* \* \* \* \*